Oct. 30, 1962 J. W. MACE 3,061,789

TRANSISTORIZED LOGARITHMIC I.F. AMPLIFIER

Original Filed April 23, 1958

INVENTORS
James W. Mace
BY
Stevens, Davis, Miller & Mosher
ATTORNEYS

United States Patent Office 3,061,789

Patented Oct. 30, 1962

3,061,789

TRANSISTORIZED LOGARITHMIC I.F. AMPLIFIER

James W. Mace, Dallas, Tex., assignor to Texas Instruments Incorporated, Dallas, Tex., a corporation of Delaware Continuation of application Ser. No. 730,462, Apr. 23, 1958. This application Feb. 27, 1959, Ser. No. 796,175

13 Claims. (Cl. 329—101)

Figures 1, 2:
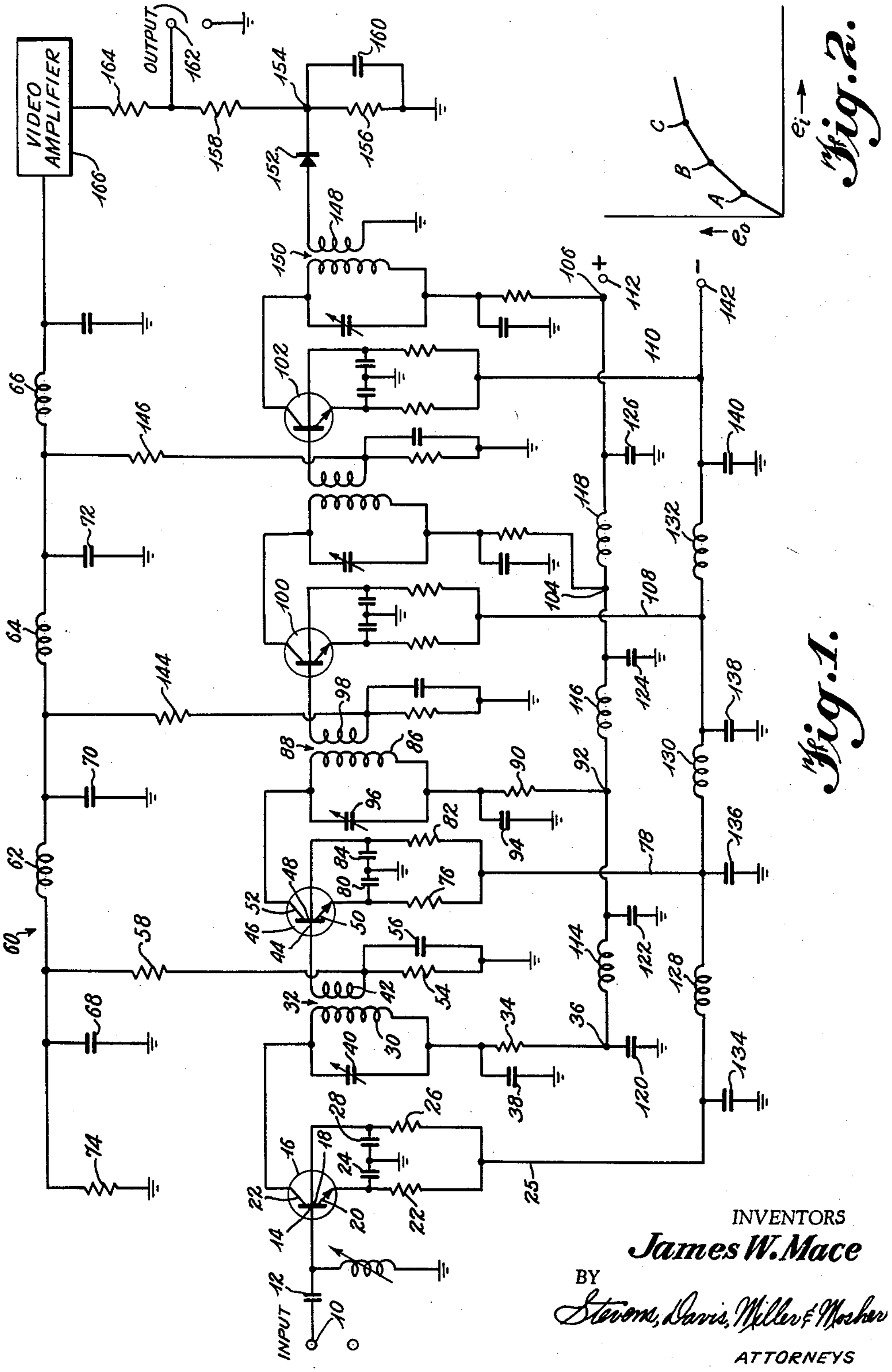

The present invention relates to voltage amplifiers and more particularly to a transistorized intermediate frequency voltage amplifier for generating a voltage output signal bearing a logarithmic relationship to a voltage input signal, and is a continuation of application S.N. 730,462, now abandoned, filed April 23, 1958.

Various circuit arrangements for imparting a logarithmic characteristic to an amplifier are known in the prior art and include such techniques as automatic gain control, operation upon a non-linear portion of an amplifying device, and by employing successive saturation of a plurality of cascaded amplifier stages.

The present invention is concerned with the latter type of logarithmic amplifier which, in accordance with the prior art, constitutes a plurality of cascaded electron tubes normally operating upon a linear or slightly curved portion of their grid to anode characteristic. The control grid of each of the cascaded stages is connected through a suitable resistor to a distinct one of a plurality of input terminals of a delay line wherein the delay through each section of the line is equal to the delay in transit of a signal through an associated amplifier stage. When the logarithmic amplifier is employed as an intermediate-frequency amplifier, and it is to this application that the present invention is directed, the output voltage of the final stage of the cascaded amplifier is applied to a detector arrangement for detecting the signal, hereinafter referred to as the video signal, contained in the envelope of the modulated intermediate frequency signal. So long as all of the stages of the amplifier are operating along the linear portion of the grid-anode characteristic, the video output voltage developed by the system bears a linear relationship to the envelope of the input intermediate frequency signal. When the input voltage attains an amplitude such that the amplified voltage applied to the control grid of the last stage of the amplifier is sufficient to cause grid current to be drawn, the voltage of the control grid cannot vary with the signal applied thereto and, therefore, the signal applied to the detector cannot further increase in amplitude. However, the grid current drawn by the final amplifier stage produces grid-to-cathode rectification of the intermediate-frequency signal, and if the intermediate frequency signal is bypassed to ground, the video signal appears on the grid and may be coupled to the delay line, and thereafter, added directly to the video signal produced by the detector at the output of the amplifier.

The video signal applied to delay line varies linearly with the magnitude of the modulation of the intermediate frequency signal, but since the signal is not amplified by the last stage, the effective gain of the amplifier is reduced from its initial value by an amount equal to the gain of the last stage. Upon further increase of the signal, successive stages of the amplifier draw grid current and the overall gain of the amplifier is successively decreased by the gain of each stage and if enough stages are employed, the variation in increase in output signal with an increase in input signal is quite small. When the output voltage amplitude is plotted against input voltage amplitude, it is seen that the total curve has a logarithmic characteristic due to the successive reductions in gain of the amplifier as each stage begins to draw grid current.

In the prior art logarithmic amplifier system described above, the video signals which are produced as a result of grid-to-cathode detection constitute voltage signals in a high impedance circuit which may be readily coupled to the delay line without substantial loss of magnitude of the signal. When it is attempted to employ transistors in the type of logarithmic amplifier circuit described above and the signal voltage is applied to the emitter-to-base circuit of successive transistor amplifier stages, a number of difficulties are encountered. Specifically, if non-linear operation of the transistors is to be effected by applying a signal to the base or emitter of such an amplitude as to cause the transistor to operate in a non-linear region, the bias relationships in the transistor are normally destroyed and, further, whatever video signal would be developed would constitute a current signal in a low impedance circuit. Since it is desired to provide voltage amplification, the problem immediately arises of converting the current signal to a voltage signal without further destroying bias relationships within the circuit and without unduly loading the parallel resonant circuit of the apparatus which determines the band pass characteristics of the intermediate frequency amplifier. In consequence of these difficulties, transistor amplifiers designed to utilize the technique of successive saturation of cascaded amplifier stages employ a distinct diode detector in conjunction with each stage of the amplifier, each diode being biased so as to become conductive upon the signal applied to that stage obtaining a predetermined amplitude. The video signals developed by each of the diode detectors are then summed and subsequently added to the signal produced by the final detector.

In accordance with the present invention, there is provided a logarithmic amplifier operating upon the principle of saturation of successive transistorized amplifier stages which does not require the utilization of a distinct diode in association with each amplifier stage. The circuit of the present invention provides a plurality of identical amplifier stages employing dual-base transistors and utilizing tuned I.F. transformers for coupling between the stages. Intermediate frequency signals are applied to the base of each of the transistors and upon the signal becoming of a sufficient magnitude to cause the transistor to operate in a non-linear region, base-to-emitter rectification occurs and produces a D.-C. component in this circuit having a magnitude which varies in accordance with the envelope of the intermediate frequency signal. In order to convert the variable current video signal in the base-emitter circuit to a useful voltage signal, a resistance is placed in series with the secondary winding of the intermediate frequency transformer which is connected in series with the base of the transistor. Such an arrangement immediately introduces considerable difficulty in that the resistor loads the intermediate frequency transformer and reduces the Q of the conventional parallel resonant tuning circuit, which includes one or both of the windings of the intermediate frequency transformer, thereby reducing the selectivity of the amplifier.

In accordance with the present invention, undue loading of the intermediate frequency transformer is overcome by bypassing intermediate frequency signals around the aforesaid resistor so as to remove the resistive load from the I.F. circuit insofar as intermediate frequency signals are concerned. Although the utilization of a bypass about the resistor connected in series with the I.F. transformer substantially minimizes the effects of the resistance upon the Q of the system, the rectified intermediate frequency signals in the emitter circuit of the transistor produce undesirable variations in the bias on the emitter electrode, and would normally render the circuit substantially inoperative for its intended purpose. This problem is overcome in accordance with the present invention by providing a video frequency signal bypass about the emitter bias resistor by means of a large valve capacitor so that only direct current drawn through the transistor can effect its bias. The video signal developed across the resistor in the base circuit of each of the transistor amplifier stages is coupled to a different section of a delay line and the signals through the delay line are summed with one another and thereafter added to a video signal produced as a result of conventional detection of the output signal developed by the last stage of the amplifier. The impedance of the resistor in the base circuit of the transistor must be relatively small so that the video signals developed therein do not affect the bias relations in the transistor circuit. Therefore, the voltage signals developed on the delay line are relatively small and, if added directly to the rectified output signal from the last stage of the amplifier, would have very little effect upon the system, that is, they would produce only a relatively small increase in the output voltage with increases in the magnitude of the input signal. Therefore, in accordance with the present invention, the signals developed on the delay line are amplified to a predetermined extent by a video amplifier, and thereafter summed with the video signal derived from the last stage of the cascaded amplifier.

It is an object of the present invention, therefore, to provide a logarithmic, intermediate frequency, transistor amplifier utilizing the principle of saturation of successive cascaded transistor amplifier stages and utilizing operation of the base-to-emitter circuit of the transistor in a non-linear region to produce detection of the video signal in each of the stages as the magnitude of the input signal increases.

It is another object of the present invention to provide a logarithmic transistor amplifier utilizing the principle of successive saturation of cascaded transistor amplifier stages, and to provide circuits for converting the detected signals flowing in the base-emitter circuit of the transistors to voltage signals without disturbing the bias relationships in the circuits or unduly loading the parallel resonance circuits associated with the intermediate frequency transformers employed for coupling signals between the cascaded stages.

It is another object of the present invention to provide a logarithmic transistor amplifier utilizing the principle of saturation of successive cascaded amplifier stages without requiring the utilization of a separate diode detector for each stage.

It is yet another object of the present invention to provide a logarithmic, intermediate frequency, transistor amplifier employing a plurality of cascaded transistor amplifier stages wherein the intermediate frequency modulating signals are recovered as a result of operation of successive cascaded stages in a non-linear region of their emitter-to-base characteristics.

The above and still further objects, features, and advantages of the present invention will become apparent upon consideration of the following detailed description of one specific embodiment thereof, especially when taken in conjunction with the accompanying drawings, wherein:

FIGURE 1 is a schematic circuit diagram of the amplifier of the present invention; and FIGURE 2 is a graph of the output voltage versus the input voltage characteristic of the amplifier.

Referring specifically to FIGURE 1 of the accompanying drawings, a modulated intermediate frequency signal is applied to an input terminal 10 of the logarithmic amplifier and coupled via a coupling capacitor 12 to a base electrode 14 of a four element junction transistor 16. The transistor 16 further comprises a second base electrode 18, an emitter electrode 20 and a collector electrode 22, and is connected as a common emitter amplifier with the emitter electrode 20 coupled through a resistor 22 to a voltage supply lead 25, which is connected at terminal 142 to a negative source of potential, as indicated. Electrode 20 is also coupled through a large value video frequency bypass capacitor 24 to ground. The second base electrode 18 of the transistor 16 is coupled via a base resistance 26 to the voltage supply lead 25, and is also coupled via an intermediate frequency bypass capacitor 28 to ground. The collector electrode 22 of the transistor 16 is coupled via a primary winding 30 of an intermediate frequency transformer 32 and a resistance 34 to a collector voltage supply terminal 36. The junction between the primary winding 30 of the transformer 32 and the resistance 34 is coupled to ground via a bypass capacitor 38. The primary winding 30 of the intermediate frequency transformer 32 has connected in parallel therewith a variable capacitor 40 which in conjunction with the winding 30 forms a parallel resonant circuit tuned to the intermediate frequency of the apparatus.

The transistor 16 and its associated elements constitute an intermediate frequency amplifier, adapted to amplify the modulated intermediate frequency signals applied to the terminal 10 and to apply these signals to a first stage of a plurality of cascaded identical amplifier stages which constitute the elements that impart a logarithmic characteristic to the amplifier output signal. The amplified intermediate frequency signals developed across the primary winding 30 of the transformer 32 are coupled via a secondary winding 42 to a base electrode 44 of a four element junction transistor 46 further comprising a second base electrode 48, an emitter electrode 50, and a collector electrode 52. The lower end, as viewed in FIGURE 1, of the secondary winding 42 of the intermediate transformer 32 is coupled via a resistance 54 to ground; the resistance 54 being shunted by an intermediate frequency bypass capacitor 56. The junction of the secondary winding 42 of the intermediate frequency transformer 32 and the resistance 54 is coupled via a resistance 58 to a delay line generally designated by the reference numeral 60.

The delay line 60 comprises a plurality of pi-connected inductors and capacitors, with the inductors forming the series elements and the capacitors forming the shunt element of the delay line. Specifically, the delay line 60 includes series connected inductors 62, 64, and 66 and shunt capacitors 68, 70, and 72 connected to the left hand ends, as viewed in FIGURE 1, of the inductors 62, 64, and 66, respectively. The capacitor 68 is shunted by a resistor 74, which forms an energy dissipating termination for the delay line 60.

Returning now to the amplifier stage, including the transistor 46, the emitter electrode 50 is coupled via a resistor 76 and lead 78 to the negative voltage supply at terminal 142 and to ground via a large value video frequency bypass capacitor 80. The second base electrode 48 is coupled via a resistor 82 to the lead 78 and through an intermediate frequency bypass capacitor 84 to ground. The collector electrode 52 is coupled via a primary winding 86 of an intermediate frequency transformer 88 and a resistance 90 to the voltage supply terminal 92. The junction of the resistor 90 and primary winding 86 is coupled to ground via a bypass capacitor 94 and the primary winding 86 is paralleled by a tunable capacitor 96 to provide a parallel resonant circuit tuned to the intermediate frequency of the amplifier. The signal developed across the primary winding 86 is coupled via a secondary winding 98 of the transformer 88 to a second stage of amplification which employs a four element transistor 100 as the amplifying element, and which is identical in all respects with the stage of amplification employing the transistor 46.

The logarithmic amplifier of the invention may have as many identical stages as required to produce the overall gain desired. In the specific example illustrated in the FIGURE 1 of the drawing, three such stages are employed, the third stage utilizing a four element transistor 102 as the non-linear element. Collector voltages are applied to the transistors 100 and 102 via voltage supply terminals 104 and 106 while emitter and second base electrode voltages are supplied via voltage leads 108 and 110.

Each of the voltage supply terminals 36, 92, 104, and 106 are supplied from a common voltage supply terminal 112 which may constitute a terminal of a battery or of a rectified voltage supply. The various terminals 36, 92, 104, and 106 are decoupled from one another, to prevent interaction between the stages, by means of series connected inductors 114, 116, and 118, each of which is disposed between a different pair of the terminals. The inductors form pi networks in conjunction with shunt capacitors 120, 122, 124, and 126, each pi network sharing the intermediate capacitor, such as the inductors 114 and 116 sharing the capacitor 122. In a similar manner, the emitter and second base electrode voltage supply leads 25, 78, 108, and 110 are isolated from one another by means of pi connected inductive and capacitive circuit arrangements constituting inductors 128, 130, and 132 and shunt capacitors 134, 136, 138, and 140. The main source of emitter voltage is the negative potential applied directly to terminal 142, which is connected via the aforesaid inductors 128, 130, and 132, in series, to the leads 25, 78, 108, and 110.

The amplifier stages employing the transistors 100 and 102 are coupled to the delay line 60 via resistors 144 and 146 which are connected between the inductors 62 and 64 and 64 and 66, respectively. The last stage of the amplifier, which employs the transistor 102, develops a voltage across a secondary winding 148 of an intermediate transformer 150 and the voltage is coupled via a detector or diode 152 to a junction 154 subsisting between a resistance 156 having one end grounded and a resistance 158. The resistance 156 is shunted by an intermediate frequency bypass capacitor 160, while the end of the resistance 158, remote from the junction 154, is connected to an output terminal 162. A resistor 164 is connected at one end to the output terminal 162, and is connected at its other end to receive output signals from a video amplifier 166 which receives input signals from the delay line 60 via the inductor 66.

In operation, each of the identical stages which employs transistors 46, 100, and 102 have the same gain so long as the amplitude of the signal applied to the base electrode of these circuit elements produce operation of the elements in a linear region. As long as this condition subsists, the amplifier functions as a conventional linear amplifier, and detection of the modulated envelope of the intermediate frequency voltage is effected by the detector or diode 152. The modulation envelope appears at the junction 154, and the intermediate frequency voltage is bypassed to ground by the capacitor 160. The voltage appearing at the junction 154 is coupled to the output terminal 162 via resistor 158, and the signals appearing at this junction vary linearily with the amplitude of the modulation envelope on the intermediate signal applied to the input terminal 10. However, if the initial amplitude of the modulation envelope applied to the input terminal 10 is such, when taken in conjunction with the gain through the stages employing transistors 46 and 100, as to drive the base electrode of the transistor 102 into a non-linear region of operation, a unidirectional current flows in the emitter-to-base circuit of the transistor 102 and a video signal is produced in its base circuit.

Specifically, upon the transistor being driven into a nonlinear region of operation, the input impedance of the transistor is a function of the input voltage, and in consequence the current in the base-to-emitter circuit is a non-linear function of the input voltage. Such operation results in the production of a D.-C. component in the circuit that varies in accordance with the envelope, the video signal, of the intermediate frequency signal applied to the base. The circuit is adjusted such that when the signal applied to transistor 102 has increased to the magnitude necessary to effect operation in its non-linear region, the base-to-collector current gain becomes substantially zero, and, therefore, the last stage of amplification is essentially ineffective to increase the output voltage in response to an increase in input voltage. A further increase in output signal results from adding the video signal developed in the base-to-emitter circuit of the transistor 102 to the video signal developed across the resistor 156.

As previously indicated, the video signal appears in the base circuit, and is coupled from this circuit to the delay line 60 and, subsequently, through the video amplifier 166 and resistor 164 to output 162 where the signal is added to the video signal developed by the diode detector 152, which is coupled to output 162 via resistor 158.

The difficulty in developing the circuit of the present invention lies in the fact that the video signal produced in the base-to-emitter circuit of the transistor 102 is a current signal flowing in a low impedance circuit, which must be converted to a voltage signal so that it can be added to the voltage signal appearing at the output terminal 162. To obtain the requisite signal voltage, a resistor corresponding to the resistor 54 associated with the transistor 46 is employed in each of the stages, and is connected in series with the secondary winding of the respective intermediate frequency transformers. The signal current flows through the resistor 54, and develops a voltage signal that is coupled via resistor 58 to the delay line 60 and, thence, through the video amplifier 166 to the output terminal 162. In order to prevent the resistors 54, etc., from loading the parallel resonant circuit comprising the primary winding of each I.F. transformer and its associated tuning capacitor, and thereby reducing the Q of the circuit and in consequence its selectivity, the intermediate frequency signals must be prevented from flowing through these resistors. This is accomplished by employing capacitors 56, etc., which bypass the intermediate frequency signals to ground.

The signals applied to the delay line 60 by each of the stages, as each stage becomes saturated, are added to the video signals developed by each of the other stages upon saturation. In order for the video signals produced by non-linear operation of each of the transistor stages to be added to the video signals produced by each of the other stages, it is necessary for each pi section of the delay line to provide a time delay equal to the delay of signals through each of the transistor stages. Similarly, the delay provided by the inductor 66 and the video amplifier 166 must be equal to the delay through transistor 102 and the detector 152.

In operation, and reference is now made to FIGURES 1 and 2 of the accompanying drawings, as the level of the input signal increases, it is amplified linearly by each of the amplifier stages, including transistors 16, 46, 100, and 102, and is detected and filtered by diode 152 and bypass capacitor 160 to develop at the output terminal 162 a video signal whose amplitude is directly proportional to the amplitude of the envelope of the intermediate frequency signal applied to the input terminal 10. Upon the level of the input signal applied to the input terminal 10 obtaining a value such that the amplified signal appearing at the base of the transistor 102 is of sufficient amplitude to produce non-linear operation in the base-to-emitter circuit thereof, further increase in the level of the output signal developed through the diode 152 is not possible, and the signal level increases only as a result of increases in the level of the video signal produced by base-to-emitter rectification. Specifically, the intensity of the video signal developed across the resistor in the base circuit of the transistor 102 is a linear function of the input signal when the emitter circuit includes a large value video frequency bypass capacitor, but since there is one less effective stage of amplification, the overall gain between the input and the output to the delay line 60 is reduced. The change in the overall gain of the amplifier is evidenced by the change in slope of the curve in FIGURE 2 to the right of the point A. The output signal appearing at the terminal 162 varies linearly along the new curve to the right of the point A in accordance with a predetermined slope determined by the gain of the transistors 14, 46, and 100 until the transistor 100 saturates. When the transistor 100 begins to operate in its non-linear region, it can no longer amplify the input signal, and the level of signal developed across the resistor 146 can no longer vary. A signal is now applied to the delay line 60 through the resistor 144. Since only two stages of amplification, the stages of the transistors 16 and 46, are effective, the total gain of this portion of the operating range of the amplifier, which is designated by the portion to the right of the point B on the curve of FIGURE 2, is less than before. Upon saturation of the stage of the transistor 46, the point C on the curve of FIGURE 2 has been reached, and now only the gain of the input amplification stage of the transistor 16 is effective and the slope of the curve of FIGURE 2 is substantially flat. It will be noted by a reference to the curve of FIGURE 2 that the output vs. input curve is logarithmic in nature, and a substantially true logarithmic characteristic may be developed by employing more stages than are employed in the illustrated embodiment of the invention, appearing in FIGURE 1 of the accompanying drawings.

The circuit does not necessarily require the utilization of the video amplifier 166, but by employing this amplifier, additional control over the overall characteristics of the circuit may be acquired, since control of the gain of this amplifier permits control of the relative amounts of the signal proceeding directly through the amplifier and the signal developed in the delay line 60 in the final signal appearing at the output terminal 162. Therefore, the amplifier 166 permits ready control of the slope of all sections of the graph of FIGURE 2 lying to the right of the point A on the curve.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A pair of low impedance input circuit saturable transistor amplifiers connected in tandem, a resistance connected to the transistor element in the input circuit of each of said amplifiers effective when a modulated signal of greater than predetermined level is applied to said input circuit for developing a voltage instantaneously proportional to the modulation component of said input signal, and means interconnecting each said resistance effective when each said resistance develops a voltage for deriving another voltage having a predetermined relationship to the developed voltages.

2. A pair of saturable amplifiers connected in tandem; each of said amplifiers comprising a transistor having an input element, an output element, and a common element; a resistor connected to the input element of each of said transistors effective when a modulated signal of greater than predetermined level is applied to said input element for developing a voltage instantaneously proportional to the modulation component of said modulation signal; means connected to each said resistor for effectively by-passing the carrier component of said modulation signal; and means interconnecting each said resistor effective when each said resistor develops a voltage for summing the developed voltages in phase.

3. A pair of saturable amplifiers connected in tandem; each of said amplifiers comprising a transistor having an input element, an output element, and a common element; a resistor connected to the input element of each of said transistors effective when a modulated signal of greater than predetermined level is applied to said input element for developing a voltage instantaneously proportional to the modulation component of said modulated signal; means connected to each said resistor for effectively bypassing the carrier component of said modulated signal, said last-mentioned means being ineffective to bypass the modulation component of said modulated signal; and means interconnecting each said resistor effective when each said resistor develops a voltage for summing the developed voltages in phase.

4. A pair of saturable amplifiers connected in tandem; each of said amplifiers comprising a transistor having an input element, an output element, and a common element; a resistor connected to the input element of each of said transistors effective when a modulated signal of greater than predetermined level is applied to said input element for developing a voltage instantaneously proportional to the modulation component of said modulated signal; means connected to each said resistor for effectively bypassing the carrier component of said modulated signal, said last-mentioned means being ineffective to bypass the modulation component of said modulated signal; biasing means connected to the common element of each said transistor; means connected to said common element in shunt of said biasing means for bypassing frequencies corresponding to those of said modulation and carrier components; and means interconnecting each said resistor effective when each said resistor develops a voltage for deriving therefrom another voltage having a predetermined relationship to the developed voltages.

5. A pair of saturable amplifiers connected in tandem, each of said amplifiers comprising a transistor having an input element, an output element, and a common element; a resistance connected to the input element in each of said amplifiers; means in each amplifier including said resistance in said each amplifier responsive to the application of a modulated signal of greater than predetermined level for causing the transistor in said each amplifier to demodulate said signal at the input element of the transistor in said each amplifier; and means interconnecting said last-mentioned means in said each amplifier responsive to two demodulated signals for deriving therefrom another signal having a predetermined relationship to said two demodulated signals.

6. A plurality of saturable transistor amplifiers each including an input stage, an output stage, a transistor having a base electrode, an emitter electrode, and a collector electrode; high impedance coupling means for serially interconnecting said transistor amplifiers in tandem; a plurality or resistors severally connected in series with the base electrodes of said transistors; means for effectively bypassing said resistors at frequencies above a predetermined frequency only; a source of modulated signals, said signals having a carrier frequency above said predetermined frequency and a modulation component at a frequency lower than said predetermined frequency; means including at least one of said resistors effective when a modulated signal of greater than predetermined level is applied to the input stage of the first amplifier in the tandemly connected series of amplifiers for developing a voltage across said at least one of said resistors proportional to the instantaneous amplitude of the modulation component of said signal, and means effective when voltages are developed across at least two of said resistors for developing another voltage bearing a predetermined relationship thereto.

7. A plurality of saturable transistor amplifiers each including an input stage, an output stage, and a transistor having a base electrode, an emitter electrode, and a collector electrode; high impedance coupling means for interconnecting said transistor amplifier stages in tandem; a source of modulated signals; a plurality of resistors severally connected in series with the base electrodes of said transistors; means for bypassing said resistors only at frequencies above the frequencies of the modulation component of said modulated signals; means including at least one of said transistors effective when the level of said modulated signals exceeds a predetermined value for developing a voltage across the resistor connected to the base electrode of said one of said transistors proportional to the instantaneous amplitude of the modulation component of said signals, and means effective when voltages are developed across at least two of said resistors for deriving another voltage proportional to the resultant thereof.

8. A logarithmic amplifier comprising a plurality of transistor amplifier stages each having an input circuit and an output circuit, each of said stages including a transistor having a base electrode, an emitter electrode, and a collector electrode, tunable high impedance coupling means for interconnecting said stages in tandem, means for tuning said high impedance coupling means to pass a predetermined narrow band of frequencies only, a plurality of resistors, each different one of said resistors being connected in series with a different one of said base electrodes, means for bypassing said resistors at the frequency to which said high impedance coupling means are tuned, means for biasing each of said stages to a non-linear operating region, thereby causing at least one of said resistors to develop modulation component voltages in response to the application of modulation signals to said amplifier, a delay line having a plurality of sections, means for coupling voltages developed across said resistors each to a different section of said delay line wherein they are summed, the delay through each section of said line being equal to the delay through each amplifier stage, a rectifier for rectifying signals developed in the tunable high impedance coupling means associated with the output circuit of the last of said stages, and means for adding said summed signals and said rectified signals.

9. A logarithmic amplifier comprising a plurality of substantially identical transistor amplifier stages, including an input stage and an output stage, each of said stages including a transistor having a base electrode, an emitter electrode, and a collector electrode, a plurality of coupling transformers having a primary winding and a secondary winding, means connecting a primary winding of each transformer in series with said collector electrode of a different one of said transistors, means for tuning each of said transformers to pass a predetermined narrow band of frequencies, said base electrode of each stage being connected in series with said secondary winding of a different one of said transformers, a plurality of resistors, each resistor being connected in series with a different one of said base electrodes, means for bypassing said resistors at the frequency to which said transformers are tuned, means for biasing said amplifier stages such that input signals of the amplitude normally expected to be applied to said input stage drive at least some of the latter of said amplifier stages into a nonlinear operating region, a delay line having a plurality of sections, means for coupling signals developed across said resistors each to a different section of said delay line wherein they are summed, the delay through each section of said line being equal to the delay through each amplifier stage, a rectifier for rectifying signals developed in said primary winding of said transformer associated with said output stage, and means for adding said summed signals and said rectified signals.

10. A logarithmic amplifier comprising an input stage and a plurality of substantially identical transistor amplifier stages including an output stage, each of said substantially identical amplifier stages including a transistor having a base electrode, an emitter electrode, and a collector electrode, a plurality of coupling transformers having a primary winding and a secondary winding, means connecting a primary winding of each transformer in series with said collector electrode of a different one of said transistors, means for tuning each of said transformers to pass a predetermined narrow band of frequencies, said base electrode of each stage being connected in series with said secondary winding of a different one of said transformers, a plurality of resistors, each resistor being connected in series with a different one of said secondary windings, means for bypassing said resistors at the frequency to which said transformers are tuned, means for biasing said amplifier stages such that input signals of the amplitude normally expected to be applied to said input stage drive at least some of the latter of said amplifier stages into a non-linear operating region, a delay line having a plurality of sections, means for coupling signals developed across said resistors each to a different section of said delay line wherein they are summed, the delay through each section of said line being equal to the delay through each amplifier state, a rectifier for rectifying signals developed in said primary winding of said transformer associated with said output stage, a signal amplifier for amplifying the signals developed on said delay line, and means for adding the signals generated by said signal amplifier to said rectified signals.

11. A logarithmic amplifier comprising a plurality of substantially identical transistor amplifier stages, including an input stage and an output stage, each of said stages including a transistor having a base electrode, an emitter electrode and a collector electrode, a plurality of coupling transformers having a primary winding and a secondary winding, means connecting a primary winding of each transformer in series with said collector electrode of a different one of said transistors, means for tuning each of said transformers to pass a predetermined narrow band of frequencies, said base electrode of each stage being connected in series with said secondary winding of a different one of said transformers, a first plurality of resistors, each resistor being connected in series with a different one of said secondary windings, a second plurality of resistors connected in series with said emitter electrodes for biasing said amplifier stages such that input signals of the amplitude normally expected to be applied to said input stage successively drive at least some of the latter of said amplifier stages into a nonlinear operating region, means for bypassing all said resistors, a delay line having a plurality of sections, means for coupling signals developed across said resistors each to a different section of said delay line wherein they are summed, the delay through each section of said line being equal to the delay through each amplifier stage, a rectifier for rectifying signals developed in said primary winding of said transformer associated with said output stage, and means for adding said summed signals and said rectified signals.

12. A logarithmic amplifier comprising an input stage and a plurality of substantially identical transistor amplifier stages including an output stage, each of said stages including a transistor having a base electrode, an emitter electrode and a collector electrode, a plurality of coupling transformers having a primary winding and a secondary winding, means connecting a primary winding of each of said transformers in series with said collector electrode of a different one of said transistors, means for tuning each of said transformers to pass a predetermined narrow band of frequencies, said base electrode of each transistor being connected in series with said secondary winding of a different one of said transformers, a first plurality of resistors each connected in series with a different one of said base electrodes, a second plurality of resistors connected in series with said emitter electrodes for biasing said amplifier stages such that input signals of the amplitude normally expected to be applied to said input stage successively drive at least some of the latter of said amplifier stages into a non-linear operating region, means for bypassing all said resistors, a delay line having a plurality of sections, means for coupling signals developed across said resistors each to a different section of said delay line wherein they are summed, the delay through each section of said line being equal to the delay through each amplifier stage, a rectifier for rectifying signals developed in said primary winding of said transformer associated with said output stage, a signal amplifier for amplifying the signals developed on said delay line and means for adding the signals generated by said signal amplifier to said rectified signals.

13. A logarithmic, intermediate frequency, amplifier comprising an input stage and a plurality of substantially identical transistor amplifier stages including an output stage, a plurality of transformers having primary and secondary windings, means for tuning said transistor amplifiers to said intermediate frequency, each of said primary windings being connected in series with the collector lead of a different one of the transistor amplifiers, the base lead of each transistor amplifier being connected in series with a secondary winding of a different one of said transformers, a plurality of resistors each connected in series with a different one of the base leads of the transistor amplifiers, means for bypassing said resistors at said intermediate frequency signal, means for biasing said transistor amplifiers so that said stages are successively operated in a non-linear region, means for summing signals developed across said resistors, means for rectifying signals appearing across the primary winding of the transformer associated with said output stage and means for adding said summed signal and said rectified signal.

References Cited in the file of this patent

UNITED STATES PATENTS

| | | |
|---|---|---|
| 2,647,957 | Mallinckrodt | Aug. 4, 1953 |
| 2,774,825 | Sherr | Dec. 18, 1956 |
| 2,864,002 | Straube | Dec. 9, 1958 |
| 2,882,350 | Stern et al. | Apr. 14, 1959 |
| 2,895,045 | Kagan | July 14, 1959 |